United States Patent [19]

Valencic

[11] Patent Number: 5,324,581
[45] Date of Patent: Jun. 28, 1994

[54] FAST AND EASY PRUNING CLOTH

[76] Inventor: Ann Valencic, 212 Altermoor Dr., Natrona Heights, Pa. 15065

[21] Appl. No.: 251

[22] Filed: Jan. 4, 1993

[51] Int. Cl.$^5$ .................. B32B 5/22; A01G 9/02; A01G 9/10
[52] U.S. Cl. .................. 428/284; 428/300; 428/124; 47/66; 47/73; 47/76; 47/78
[58] Field of Search .................. 428/284, 300; 47/66, 47/73, 76, 78

[56] References Cited

U.S. PATENT DOCUMENTS

D. 301,536   6/1989   Spear .................. 141/391
3,550,662   12/1970   Penke .................. 47/37
4,539,800   9/1985   Furmaga .................. 47/25

Primary Examiner—George F. Lesmes
Assistant Examiner—Kathryne E. Shelborne

[57] ABSTRACT

The pruning-cloth is a heavy duty fabric supported by two light weight poles which can be guided under any type or size shrub with very little effort. Once the cloth has been positioned under the shrub, the pruning is ready to begin. The clippings will fall onto the cloth, saving valuable time and energy, as there is virtually no clean-up or raking. After the shrub is totally pruned, carefully shift the clippings toward the center of the cloth, bringing the poles or guides together, holding them horizontally until they are held vertically over a container, such as a 30 or 40 gallon trash can. The clippings will fall with ease neatly into the container. You are now ready to begin your next shrub with no cleanup behind you.

4 Claims, 3 Drawing Sheets

FAST AND EASY PRUNING CLOTH

FIELD OF THE INVENTION

This invention relates to trimming shrubs with a heavy-duty flexible cloth having light supports which can be guided under any type of shrub with little effort to catch shrub trimmings and for transporting these trimmings for easy disposal.

BACKGROUND OF THE INVENTION

1. Field of the Invention

This invention relates to trimming shrubs and refers more specifically to a Pruning Cloth which includes a flexible mat supported by light weight poles. At one end of the Pruning Cloth an extension flap is provided for greater coverage of the surface area around the shrub, this will ensure that all clippings from the shrub will fall onto the Pruning Cloth for easy disposal.

2. Description of the Prior Art

For years shrub pruning has been a tedious and undesirable job due to the fact that nothing prevented the shrub's pruned clippings from falling in and among decorative woodchips, gravel, stones, or ground cover, which induce many exasperating hours of difficult clean up.

Many types of tools had been used unsuccessfully to catch shrub clippings. These tools, by there design, caused muscle strains by forcing the person to bend over the shrub to install and remove the tool in an unnatural lifting position thereby causing damage to the surrounding area of the shrub, and to one's body. The Fast and Easy Pruning Cloth can be used with minimal effort, has no impact on back muscles, and can be placed without bending over the shrub for installation or removal. The clippings are securely contained until transported to a suitable container for disposal. The Fast and Easy Pruning Cloth when used, will become an indispensable garden tool, it will eliminate hours of tedious clean up, and keep all decorative materials used around shrubs well groomed with minimal work.

SUMMARY OF THE INVENTION

The Fast and Easy Pruning Cloth is composed of two pieces of heavy duty cloth with extension flaps. When both pieces of cloth are placed on each side of the shrub being pruned, the shrub will be completely encased, so all clippings will fall onto the pruning cloth. This will eliminate tedious hours of clean up. The Fast and Easy Pruning Cloth can be used for any size or shape of shrub. After pruning is completed, the extension flaps are folded toward the center of the main cloth. Then the two poles are brought together to form a pocket which can be lowered into a container for easy disposal of the shrub's clippings.

DESCRIPTION OF THE PREFERRED EMBODIMENT

Figure 1:
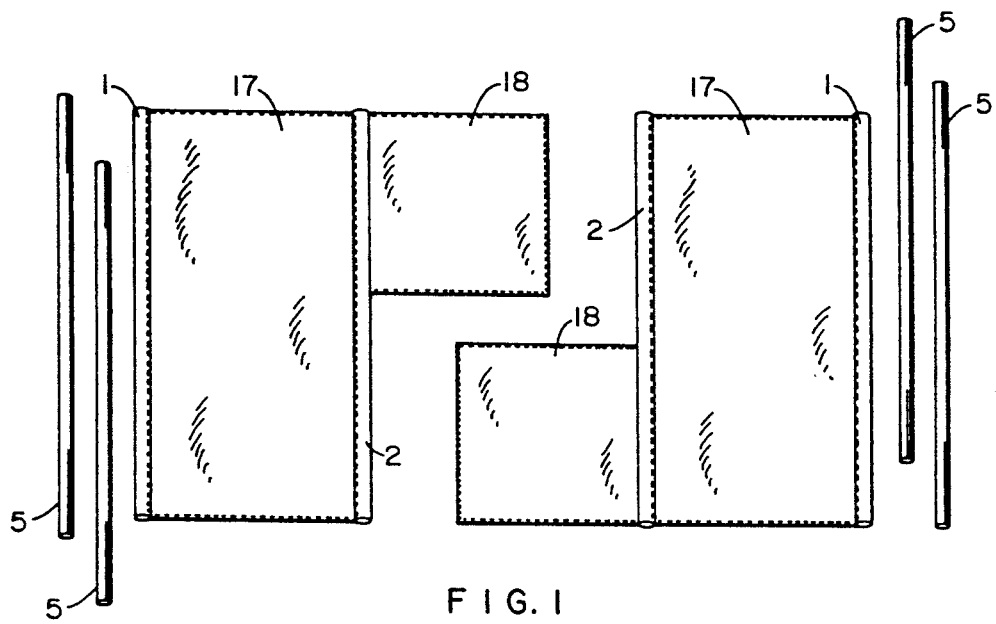
FIG. 1 is a perspective of the pruning cloth with a auxiliary lifting means according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is there is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a pruning cloth 17 which measures seventy two inches long by forty five inches wide, which is the main body of the pruning cloth. An extension flap 18 which measures thirty inches long by thirty inches wide is sewn to the main body of the cloth 17. There are two supporting poles 5 constructed of, but not limited to, plastic tubing which measures three quarters of an inch in diameter by seventy four inches long. These poles are inserted in the slots provided 1 and 2 on each side of the cloth. The slots 1 and 2 are formed by folding one and one half inches along the side of the cloth 17 which measures seventy two inches in length. It is then sewn down with a fray proof stitch approximately one quarter of an inch wide. The extension flaps 18 are used to cover the area which cannot be covered by the main body of the pruning cloth 17.

Figure 2:
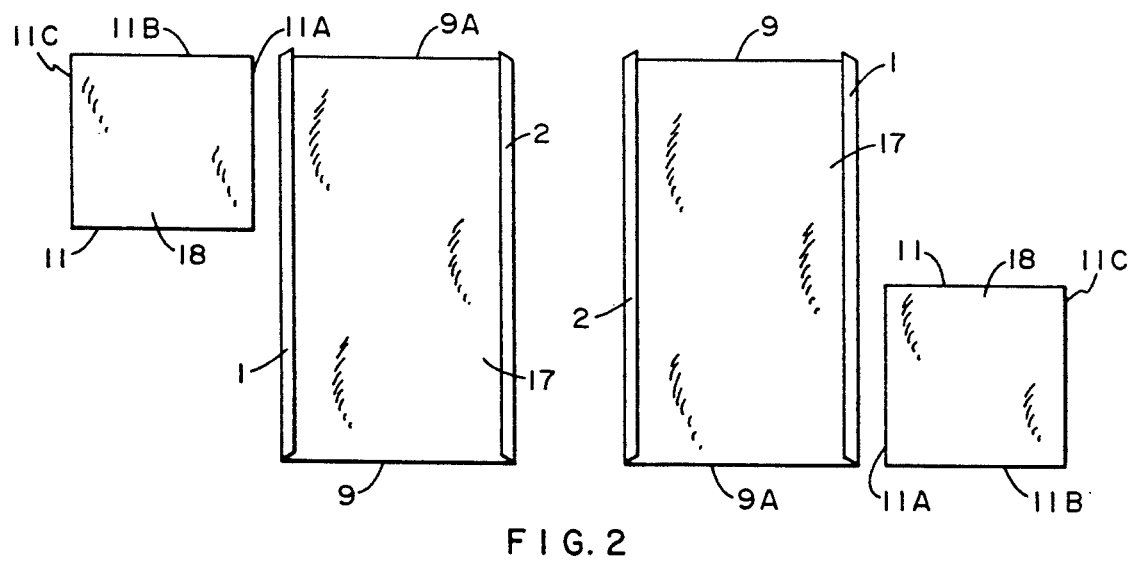
FIG. 2 shows a diagram of the underside construction before it is assembled.

Referring to FIG. 2, this is a sectional view of the main cloth 17 before it is hemmed. The top and bottom edge which measure forty five inches, is turned down one quarter of an inch from the edge and stitched down 9 and 9a with a fray proof stitch approximately one eighth of an inch wide from the edge. The one and one half inch slots 1 and 2 are folded down along the side which measures seventy two inches in length and fray proof stitched approximately one quarter of an inch wide from the edge. The flap extension 18 which measures thirty inches by thirty inches is turned under one quarter of an inch on all sides. Three sides are fray proof stitched approximately one eighth inches wide from the edge 11, 11A, and 11B leaving the fourth side to be attached when the cloth 17 is turned over 11C.

Figure 3:
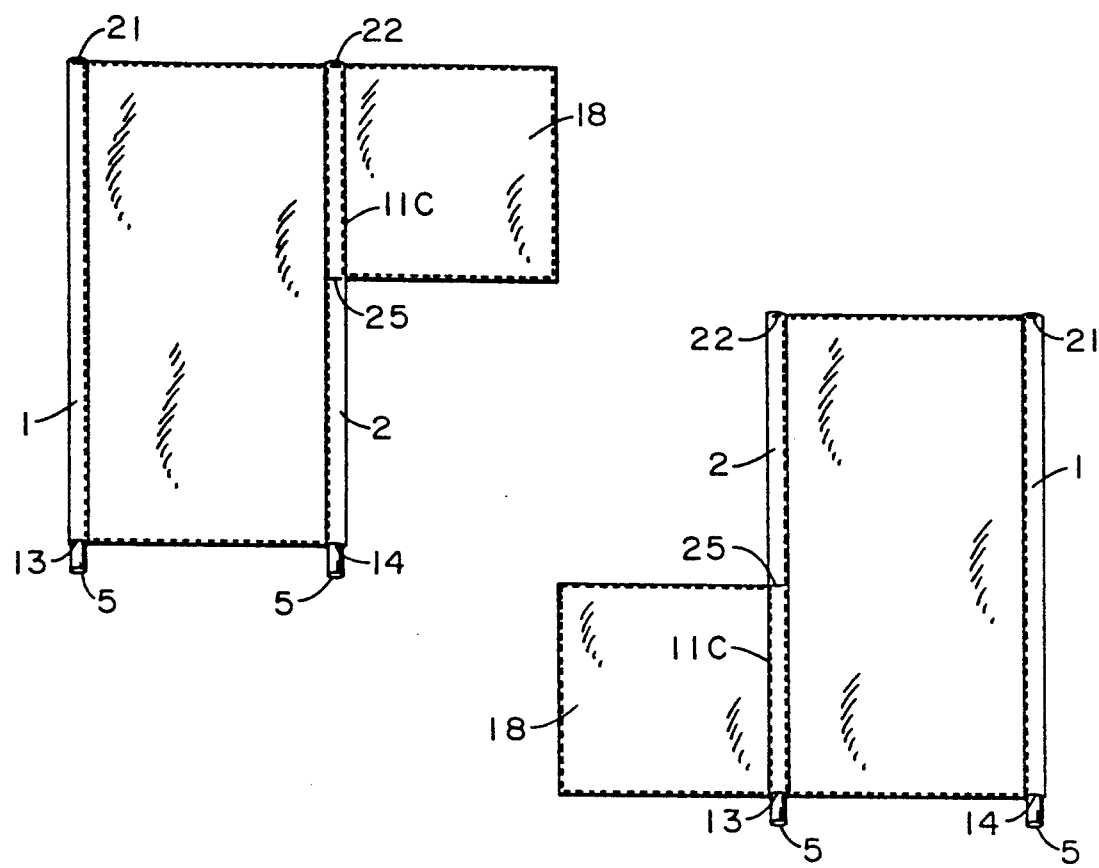
FIG. 3 is a perspective view of the completed pruning cloth right side up, with the support poles inserted in their slots and extension flaps attached.

Referring to FIG. 3, the illustration shows the pruning cloth right side up. The left side of the extension flap 18 is turned under one quarter of an inch and placed on top and along the upper right side of the slot 2 and is sewn down one eighth of an inch from the edge. It is then bar-tacked at point 25 to prevent tearing. The tops of the pole inserts 1 and 2 are bar-tacked at points 21 and 22 to prevent the poles from slipping out. The plastic poles 5 are inserted in their slots 13 and 14 which extend approximately two inches from the finished product.

Figure 4:
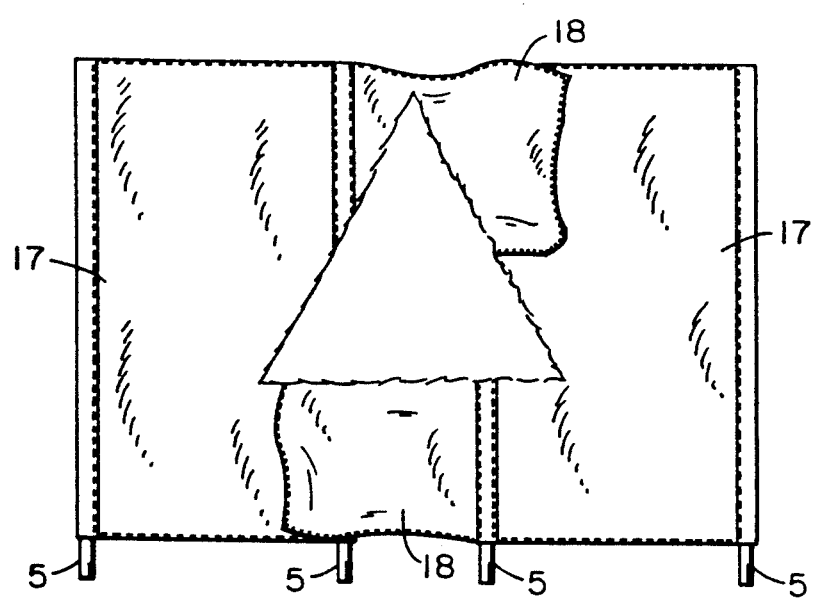
FIG. 4 is an illustrated view showing how clippings will fall onto the pruning cloth while the shrub is being pruned.

Referring to FIG. 4, this illustration shows how to position the pruning cloth under the shrub for pruning. Guide the pruning cloth 17 by using the support poles 5 under the shrub to be pruned and extend the flap 18. Follow the same procedure for the other side of the shrub. The shrub will be completely surrounded and ready for pruning. The clippings that are cut from the shrub being pruned fall directly onto the cloth from any side of the shrub.

Figure 5:
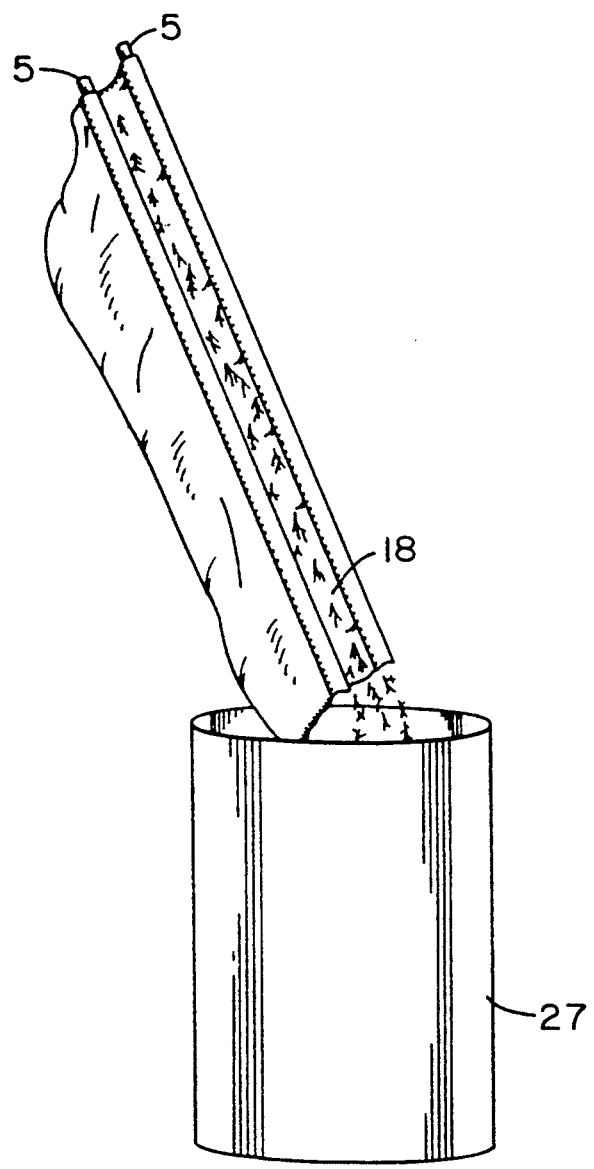
FIG. 5 is a perspective view that shows how the cloth is held to form a chute for easy disposal of the clippings.

Referring to FIG. 5, When the shrub pruning is completed, fold the extension flap 18 toward the main body of the cloth 17, then bring the two supporting poles together. This procedure will form a chute in the main cloth 17. Put the end of the cloth to the container (see FIG. 5) and lift. The cut clippings will then slide down the formed chute and into the container for easy clean up and disposal.

What is claimed is:

1. A prune cloth for catching and removing shrub trimmings comprising in combination: a pair of essentially rectangular sheets of heavy duty pliable material, each sheet having an essentially square flap attached thereto so as to form two L-shaped sheets such that when the sheets are laid flat, the flaps complement one another to completely enclose the shrub being trimmed; the sheets having sleeves stitched on both sides thereof and said sleeves having parallel poles therein for support and lifting such that after use the prune cloth may be folded into a chute and used to carry the clippings to a refuse container.

2. The prune cloth of claim 1, wherein fray-proof stitching is used along all sides and ends of the sheets to provide added strength and prevent unraveling.

3. The prune cloth of claim 1, wherein the poles are constructed of plastic tubing.

4. The prune cloth of claim 1, wherein each sheet measures approximately seventy two inches long and approximately forty five inches wide, each flap measures about thirty inches square and the tubing is about seventy four inches long and about 0.75 inch in diameter.

* * * * *